United States Patent
Cuddihy et al.

(10) Patent No.: US 8,831,839 B2
(45) Date of Patent: Sep. 9, 2014

(54) METHOD AND APPARATUS FOR DETERMINING POSITION OF MOTOR VEHICLE SEAT

(75) Inventors: Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 13/351,467

(22) Filed: Jan. 17, 2012

(65) Prior Publication Data

US 2013/0184942 A1 Jul. 18, 2013

(51) Int. Cl.
*B60R 22/00* (2006.01)

(52) U.S. Cl.
USPC ............... 701/49; 701/45; 180/282; 280/735

(58) Field of Classification Search
CPC .......... B60R 2021/0157; B60R 21/015; B60N 2/0232; B60N 2002/0272; B60N 2/02
USPC ............ 701/45, 49, 36; 180/282; 280/735; 324/207.12; 73/1.79
See application file for complete search history.

(56) References Cited

U.S. PATENT DOCUMENTS

| | | | | |
|---|---|---|---|---|
| 5,751,129 A * | 5/1998 | Vergin | | 318/467 |
| 6,270,115 B1 * | 8/2001 | Andreen et al. | | 280/735 |
| 6,788,048 B2 * | 9/2004 | Hedayat et al. | | 324/202 |
| 6,870,366 B1 | 3/2005 | Becker et al. | | |
| 7,804,210 B2 | 9/2010 | O'Day et al. | | |
| 2003/0075378 A1 * | 4/2003 | Sprinkle et al. | | 180/321 |
| 2007/0164619 A1 | 7/2007 | Greene | | |
| 2009/0184708 A1 | 7/2009 | Bujak et al. | | |

OTHER PUBLICATIONS http://www.flxya.com/cars/t2147792-2001_lincoln_ls_selecting_seat_mirror. Problem with the 2001 Lincoln LS—2001 Lincoln LS Selecting seat/mirror/steering, Nov. 9, 2010.

* cited by examiner

*Primary Examiner* — Gertrude Arthur Jeanglaude
(74) *Attorney, Agent, or Firm* — Frank A. MacKenzie; Brooks Kushman P.C.

(57) ABSTRACT

Apparatus for moving an automotive vehicle seat along a track includes a motor, a first sensor sensing rotation of the motor, and a second sensor detecting presence of the seat at a reference position along the track. A controller determines a seat position based upon signals from the first sensor and calibrates the determined seat position based upon a signal from the second sensor indicating that the seat is at the reference position. This allows any error that as accumulated in the seat position as determined by the first sensor to be eliminated each time the seat reaches the known reference position.

19 Claims, 1 Drawing Sheet

METHOD AND APPARATUS FOR DETERMINING POSITION OF MOTOR VEHICLE SEAT

TECHNICAL FIELD

The present invention relates to a method and apparatus for sensing the position of an occupant seat of a motor vehicle. More specifically, the invention relates to a method and apparatus for calibrating a system used to detect the position of the seat.

BACKGROUND

Motor vehicles typically have a driver's seat that may be moved forward and rearward so that a driver is able to position the seat at a desired distance from the controls. The seat may, for example, be mounted on a track or rail that runs along the longitudinal (forward/rear) axis of the vehicle. As is well known in the vehicle seating art, a power seat mechanism may use an electric motor to move the seat along the track. The driver is thus able to adjust the seat position by simply moving a manual switch. Other seats in a vehicle may also be adjustable in this manner, most commonly the passenger seat next to the driver's seat in the front seating row of the passenger cabin.

Occupant safety systems sometimes use the forward/rearward position of the driver and/or front seat passenger as a factor in making decisions regarding activation of occupant restraints. For example, a frontal collision air bag may undergo a condition change in response to seat position. For example, the airbag may be deactivated or inflated less rapidly and/or less forcefully if the seat is forward of a reference position. In such systems, the seat position is typically detected by a sensor that indicates only two states: forward of the reference position or rearward of the reference position. These two-state or binary sensors change state only once during travel of the seat along the length of the rail on which the seat moves.

In at least one known system using a two-state sensor, a Hall-effect sensor is located on or adjacent to the seat track and detects the presence of a metal component on the movable seat frame when the seat passes by the sensor.

Some vehicle seating systems utilize an absolute seat position tracking system. In this context, "absolute" refers to the ability to identify the position of the seat at any spot along the range of forward/rear movement, rather than just forward or rearward of a reference location.

Tracking of the absolute seat position may be used to enable a seat position memory function, and/or entry/exit function wherein the seat is automatically moved rearward when the ignition key is removed from the switch and/or the driver door is open.

Some occupant safety systems also may use the absolute seat position to optimize decisions regarding the activation of passenger restraints (and/or other safety systems) with the goal of providing the most safety benefit during a collision or other incident.

Known absolute seat positions sensors utilize a continuously variable resistor and/or magnets to determine seat position along the entire length of the seat travel. However, such sensors are relatively large and heavy and so may be difficult to integrate into the seat frame/drive mechanism because of the limited package space.

Other sensors have been proposed which measure rotational movements of the shaft of a motor driving seat, but asynchronous movement between the seat and motor can occur due to elastic coupling of the drive mechanism. Such elastic coupling may be due to slippage or "play" between various components of the seat drivetrain. Such asynchronous movement makes it necessary to recalibrate the measurement after a period of operation in order to maintain accuracy.

Knowledge of the absolute seat position, as opposed to the binary or two-state position, may be used to advantage in occupant safety systems in many ways. For example, the absolute seat position may be used (by itself or in combination with others factors) to infer the size of the occupant of the seat (height and/or weight). This occupant size inference is based upon the assumption that a person of smaller stature is more likely to position the seat farther forward (in order to comfortably reach to the controls) and a larger statured person is more likely to position the seat farther to the rear. Both the size of the occupant and position of the occupant relative to the interior of the vehicle may be considered by a Restraint Control Module (RCM) in making decisions as to the deployment or activation of the passenger restraints (and/or other safety systems) in a manner designed to provide the most safety benefit during a collision or other incident.

SUMMARY

According to one embodiment, apparatus for moving an automotive vehicle seat along a track comprises a motor, a first sensor sensing rotation of the motor, and a second sensor detecting presence of the seat at a reference position along the track. A controller determines a seat position based upon signals from the first sensor and calibrates the determined seat position based upon a signal from the second sensor indicating that the seat is at the reference position. This allows any error that as accumulated in the seat position as determined by the first sensor to be eliminated each time the seat reaches the known reference position.

According to a further embodiment, the first sensor senses rotation of the motor indirectly by sensing movement of a drivetrain component driven by the motor.

According to a further embodiment, the first sensor comprises a Hall Effect sensor that senses rotation of a gear.

According to a further embodiment, the reference position corresponds to a seat position at which an occupant safety system undergoes a condition change.

A method of calibrating a seat position sensing system is disclosed, the method comprising determining a position of a seat along a track by measuring rotation of a seat motor, detecting presence of the seat at a reference position along the seat track, and calibrating the determined position to match the reference position.

DETAILED DESCRIPTION

Figure 1:
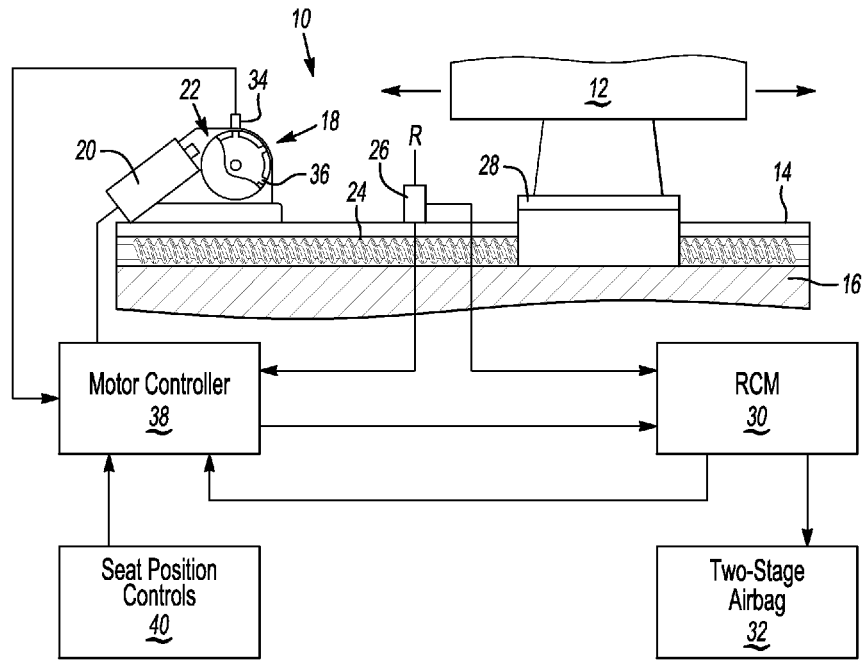
FIG. 1 is a schematic diagram of a front seat drive mechanism and control components according to an embodiment of the present invention.

Referring to FIG. 1, a power seat mechanism 10 includes a seat frame 12 mounted for longitudinal (forward/rearward) movement relative to a seat track 14 mounted to a floor 16 of a vehicle interior. A power drive unit 18 includes an electric motor 20 and a drivetrain 22 which may comprise one or more gears and/or other motion transfer components, as is well known in the art. Drive unit 18 is shown as being fixed relative to the track 14 and/or floor 16, but it is also possible for the some or all of the drivetrain components to be mounted to (or otherwise movable along with) seat frame 12. In the depicted system, drive unit 18 moves seat 12 along track 14 by means of a linear actuator 24 extending along the track. For example, linear actuator 24 may be a worm gear, a Bowden cable, or a slotted tape that is driven by drivetrain 22.

A two-state seat position sensor 26 is located at a reference position R relative to seat track 14 and senses when a portion of the seat 12 reaches or passes the reference position. Reference position R is located at a midpoint of seat track 14, the midpoint being defined as any point located between the extreme front and rear ends of the track and that is consistent with the operation of a two-stage air bag system, as is described in the paragraph below. Seat position sensor 26 is a binary switch, that is it has two states; state 1 is when seat 12 is located to the rear of the reference position and state 2 is a state when the seat is forward of the reference position. For example, sensor 26 may incorporate a Hall-effect sensor which senses the proximity of a metallic portion 28 of seat frame 12. If the appropriate portion of seat frame 12 is not made of a ferrous material, a plate or strip made of steel (or other suitable ferrous metal) may be attached to the seat frame at a location where it will pass close to sensor 26 when the seat reaches the reference position. When seat frame 12 moves far enough forward on track 14 for metallic portion 28 to be detected by sensor 26, the seat is considered to be at or forward of the reference position R. When sensor 26 does not detect metallic portion 28, this indicates that the seat is to the rear of reference position.

A two-state seat position sensor of the type described above may be used in an occupant safety system to provide an input to a restraints control module (RCM) 30. The input or signal from sensor 26 may be used to contribute to a condition change of the occupant safety system. RCM 30 may control activation of an occupant restraint, such as an airbag 32, and/or other safety devices. In one example, airbag 32 may be a two-stage airbag that is controlled by RCM 30 to deploy at a first stage or level (rapidly and/or fully, for example) if the seat 12 is rearward of the reference position R, and at a second stage or level (less rapidly and/or less fully than the first stage, for example) if the seat is forward of the reference position. Restraint activation decision made by RCM 30 may be based on signals from any number of other sensors (not shown) besides seat position sensor 26.

A drivetrain sensor 34 detects the rotation of motor 20. Sensor 34 may directly detect rotation of an output shaft of motor 20 or the sensor may detect motor rotation indirectly by sensing rotation (or other movement) of a drivetrain component other than the motor shaft itself. In the embodiment depicted in FIG. 1, for example, sensor 34 detects rotation of a gear 36. Examples of the types of devices that may be used for sensor 34 include a rotary variable resistor and a Hall Effect sensor.

Figure 2:
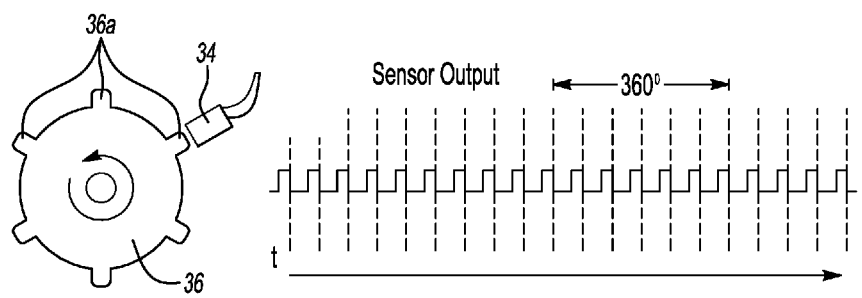
FIG. 2 is a schematic depiction of the output from a Hall Effect sensor mounted to sense rotation of a gear.

As seen in FIG. 2, drivetrain sensor 34 may be located to sense passage of one or more teeth 36a of the gear 36. In such an arrangement, a Hall Effect sensor is suitable. In the example shown, each of the six gear teeth 36a are sensed by drivetrain sensor 34 and the sensor generates a pulse or step signal each time a tooth passes the sensor. The resulting output of a Hall Effect sensor may be generally similar to that shown in the accompanying graph of FIG. 2, with six pulses indicating a full rotation of the gear. Since the relevant geometries of gear 36, worm gear 24, and other pertinent components of the drivetrain are known, the gear rotation is easily correlated to the linear movement of seat 12 along track 14.

A motor controller 38 receives signals from drivetrain sensor 34 and determines the absolute position of seat 12 relative to track 14. Motor controller 38 also may receive inputs from seat position controls 40 which are operated by the occupant of the seat 12 to adjust the position of the seat as desired. Seat position controls 40 may also serve (in conjunction with motor controller 38) to enable a seat position memory function and/or an entry/exit function. In the entry/exit function, the seat is automatically moved fully rearward in response to an action or signal that indicates the driver is about to exit the vehicle (when the ignition key is moved to off and/or the transmission is placed in PARK, for example) and returned to the last selected position in response to another signal indicating the driver is ready to operate the vehicle. Motor controller 38 controls activation of motor 20 as necessary to move the seat 12 to the desired position.

Each time motor 20 is activated to move seat 12 forward or rearward, motor controller 38 reads drivetrain sensor 34 and continuously determines the absolute seat position relative to track 14. This absolute seat position based solely on the input from drivetrain sensor 34 is, however, subject to "drift" away from an accurate seat position reading due to asynchronous movements between the motor, drivetrain components, and the seat 12 itself. Such asynchronous movement may be due to elastic coupling of the drive mechanism, for example, and/or slip between adjacent components of the drivetrain.

The absolute seat position tracked by motor controller 38 may be recalibrated to improve accuracy by utilizing the signal produced by binary sensor 26 each time it detects the presence of seat 12 at the reference position R. This may be accomplished by relaying the sensor signal to motor controller 38 from RCM 30 or by sending the signal directly from sensor 26 to motor controller 38, if such a direct connection is provided. Since the reference position is known, the recalibration eliminates any error in absolute seat position determined by motor controller 38 based on signals from drivetrain sensor 34. If the absolute seat position is to be used by RCM 30 for making restraint deployment decisions, the absolute seat position is continuously communicated from motor controller 38 to the RCM for its usage.

By recalibrating the absolute seat position each time the seat 12 reaches the reference position R, seat position error is kept to a minimum during normal operation of the vehicle and without any purposeful action by the driver. This is an advantage over requiring a dedicated calibration procedure, as is known in the prior art. In one known prior art calibration procedures, the seat is driven through its full range of motion, both forward and rearward, and the full forward and full rearward positions are monitored and recorded by the motor controller.

In a power seat system including the entry/exit function described above, the fact that the seat automatically moves fully rearward in anticipation of the driver exiting the vehicle may also be used to recalibrate the absolute seat position. The "full rearward" position may be used as the reference position and each time the exit function is triggered, when the seat stops at the full rearward position the absolute seat position may be calibrated to match that reference position. In this case, the absolute seat position may be determined without a signal from seat position sensor 26.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for moving an automotive vehicle seat along a longitudinal track comprising:
   a motor;
   a first sensor sensing rotation of the motor;
   a binary sensor changing state when the seat passes a reference position at a mid-point of the track; and
   a controller determining a seat position based upon a signal from the first sensor and calibrating the determined seat position based upon a signal from the binary sensor when the seat passes the reference position.

2. The apparatus of claim 1 wherein the first sensor senses rotation of the motor indirectly by sensing movement of a drivetrain component driven by the motor.

3. The apparatus of claim 2 wherein the drivetrain component is a gear.

4. The apparatus of claim 1 wherein the first sensor comprises a Hall Effect sensor.

5. The apparatus of claim 1 wherein the reference position corresponds to a seat position at which an occupant safety system undergoes a condition change.

6. The apparatus of claim 5 wherein the occupant safety system is an air bag.

7. The apparatus of claim 6 wherein the condition change is between a first level of deployment when the seat is forward of the reference position and a second level of deployment when the seat is rearward of the reference position.

8. Apparatus for sensing position of a seat movable along a longitudinal track by a motor comprising:
   a first sensor detecting rotation of the motor;
   a binary sensor detecting movement of the seat past a reference position at a mid-point of the track; and
   a device determining a current position of the seat along the track using the detected motor rotation and calibrating the current position to match the reference position based on a signal from the binary sensor.

9. The apparatus of claim 8 wherein the device is a seat motor controller.

10. The apparatus of claim 8 wherein the first sensor senses rotation of the motor indirectly by sensing movement of a drivetrain component driven by the motor.

11. The apparatus of claim 8 wherein the first sensor comprises a Hall Effect sensor.

12. The apparatus of claim 8 wherein the binary sensor sends a seat position signal to a restraints control module.

13. The apparatus of claim 12 wherein the reference position corresponds to a seat position at which an occupant safety system undergoes a condition change.

14. The apparatus of claim 13 wherein the occupant safety system is an air bag.

15. A method of calibrating a seat position sensing system comprising:
   determining a position of a seat along a longitudinal track by measuring rotation of a seat motor;
   detecting movement of the seat past a reference position at a mid-point of the track using a binary sensor; and
   calibrating the determined position to match the reference position.

16. The method of claim 15 wherein the determining step comprises sensing movement of a drivetrain component driven by the seat motor.

17. The method of claim 16 wherein the determining step further comprises operating a Hall Effect sensor to sense movement of the drivetrain component.

18. The method of claim 15 wherein the movement of the seat past the reference position is monitored by a restraints control module.

19. The method of claim 15 wherein the position of the seat along the track is monitored by a seat motor controller.

* * * * *